Nov. 3, 1931.  J. J. MILLER ET AL  1,830,000
COFFEE URN
Filed July 19, 1928   2 Sheets-Sheet 1

Witness:
Harry R. L. White.

Inventors:
John J. Miller,
Richard J. Demeree,
Herbert Delafield.
By Mason Fenwick & Lawrence Attys.

Nov. 3, 1931.  J. J. MILLER ET AL  1,830,000
COFFEE URN
Filed July 19, 1928    2 Sheets-Sheet 2
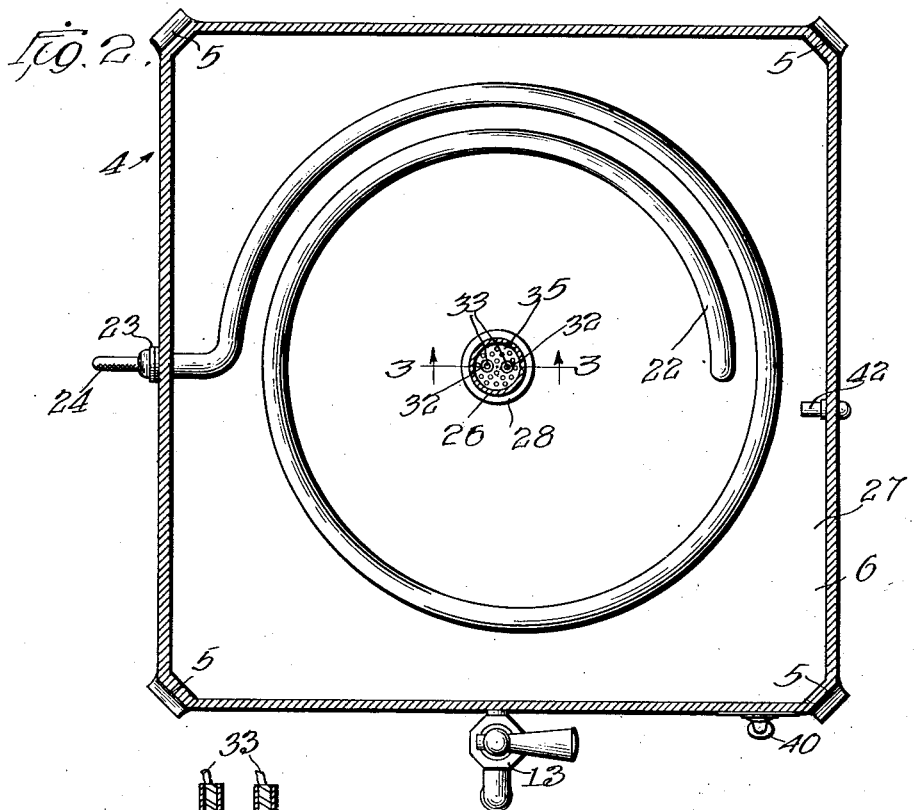
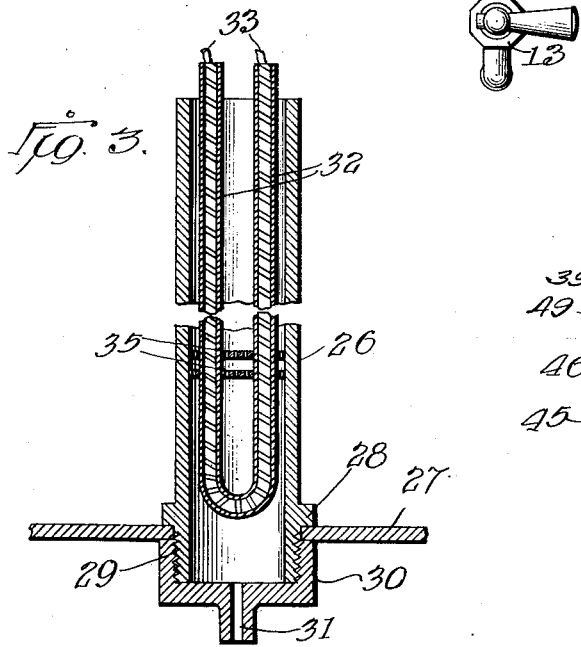
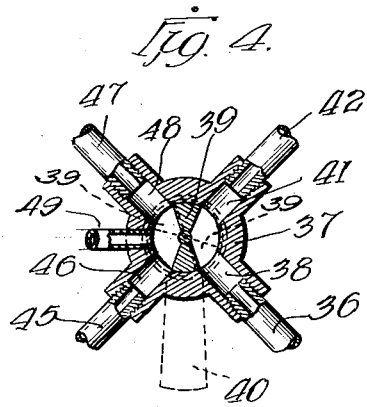
Inventors.
John J. Miller,
Richard J. Demeree,
Herbert Delafield
By Mason Fenwick+Lawrence
Attys.

Patented Nov. 3, 1931

1,830,000

UNITED STATES PATENT OFFICE

JOHN J. MILLER, RICHARD J. DEMEREE, AND HERBERT DELAFIELD, OF CHICAGO, ILLINOIS; SAID DEMEREE ASSIGNOR TO ROBERT L. HUNTER, OF CHICAGO, ILLINOIS

COFFEE URN

Application filed July 19, 1928. Serial No. 293,993.

This invention relates to a coffee urn or apparatus for preparing coffee and the like.

The object of the invention is to produce an improved coffee urn for making a superior grade of filtered coffee quickly, which is accomplished by creating a vacuum between the filter and the liquid coffee receptacle, the vacuum thus created in the receptacle drawing the water through the ground coffee, filtering paper and perforations in the filter, so as to effect the filtering of the coffee at boiling temperature of the water. According to the correct principle of making coffee the water should be as near boiling as possible in order to obtain the proper flavor, and in this connection, the water is caused to flow over into contact with a heating element at a very high temperature thus resulting in the boiling of the water for only a very short period, prior to the passing thereof through the coffee in the filtering operation.

In accordance with this invention, the water is preheated before flowing over into the boiling heater element, when it will run into the filter quickly so as to avoid cooling off. If the water is boiled too long, the air is driven therefrom and salts are deposited, which affect unfavorably, the flavor of the coffee. The present urn or apparatus is designed especially to avoid too much previous boiling as well as super heating and to get the water sufficiently hot to procure proper results. Another object of the invention is to make coffee quicker than it can be made by an ordinary filter process and also make the coffee which is chemically more perfect because of instantaneous fusion of water which has just been brought to a boil, with the coffee grounds. Therefore, the device makes a better cup of coffee by combining a heating element which works instantaneously with a suction process which draws the hot water through the filter instantaneously.

Another object of the invention is to provide a coffee urn of simple construction having a water containing receptacle with a central overflow pipe containing the heater for boiling the water as it overflows into said pipe, a receptacle beneath for receiving the percolated coffee as prepared and over which the ground coffee is supported for receiving the water in the preparation of the coffee or beverage, with means for drawing the coffee off of the beverage container as desired, and additional means for supplying water to the boiler and controllable to create a vacuum beneath the ground coffee to draw the water through the latter, filtering paper and perforations in the ground coffee container or filter thereby permitting the coffee to be quickly prepared with proper results.

With the above and other objects in view, the invention consists in certain novel combinations and arrangements of parts to be hereinafter more fully set forth and described.

In the accompanying drawings:

Figure 2 is a horizontal sectional view taken on the section line 2—2 of Figure 1.

Figure 1:
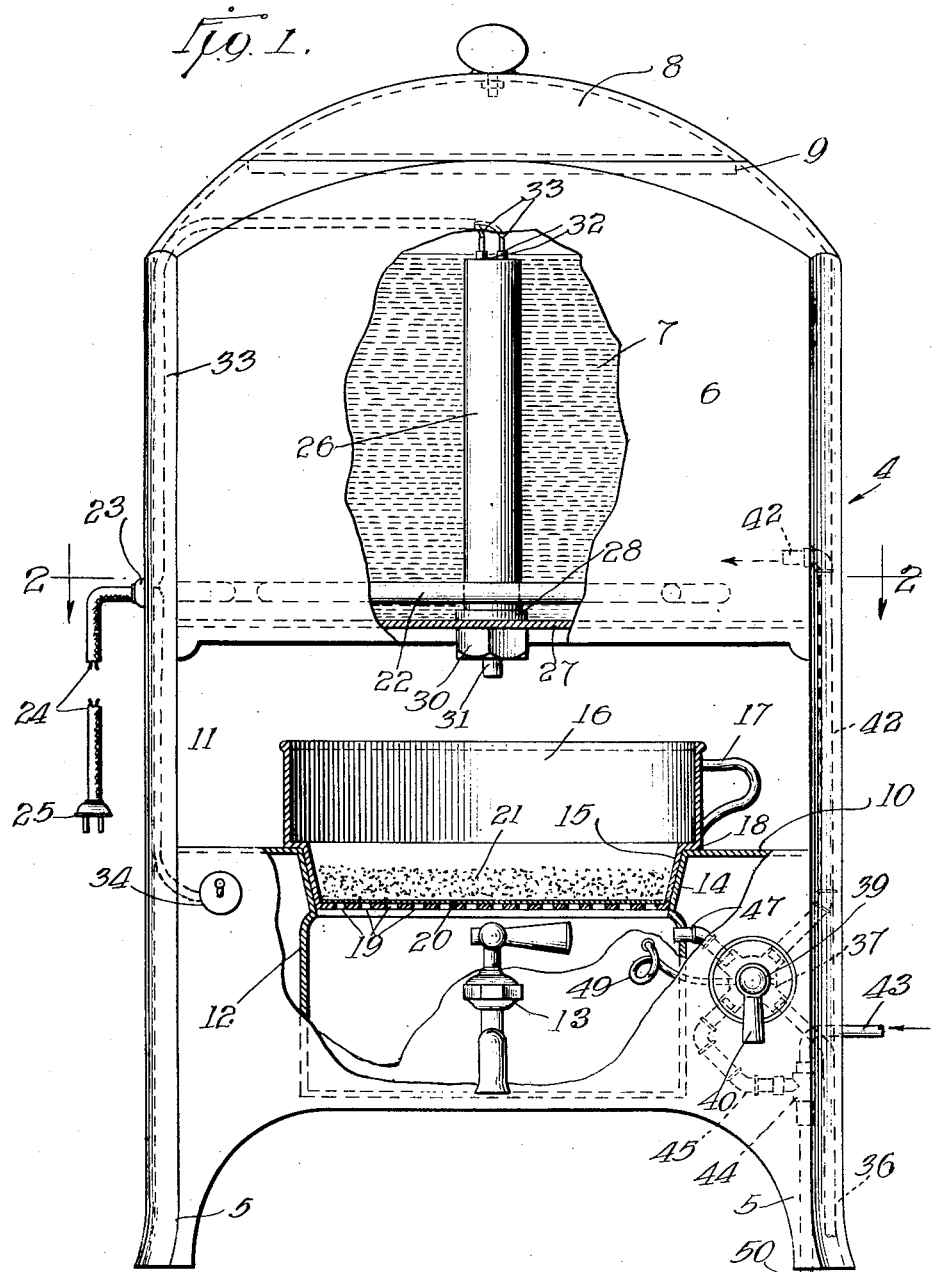
Figure 1 is a front elevation of a coffee urn constructed in accordance with the invention, parts being broken away and in section to illustrate the interior construction.

Figure 3 is an enlarged vertical sectional view of the overflow pipe or cylinder and heater for boiling the water, taken on the section line 3—3 of Figure 2, and Figure 4 is an enlarged detailed sectional view of the control valve for controlling the supply of water to the boiler and the suction of vacuum for drawing the water through the ground coffee, filtering paper and perforations in the filter.

Referring to the drawings in detail, in which like reference characters designate corresponding parts throughout the several views, the improved coffee urn is generally designated at 4 and is shown as a casing which may be enameled or nickled, and has corner legs or feet 5 adapted to be mounted or secured upon a counter or the like. This urn comprises a chamber 6 for containing water designated at 7, and is in the form of a boiler having a removable cover 8 for obtaining access thereto for cleaning and the like through the opening 9. The boiler 6 terminates at a spaced distance above a partition 10 in the bottom portion of the urn or casing providing an intermediate space 11 for obtaining access to the filter as will be later set forth. The partition 10 is in reality a rim or flange on a coffee containing or receiving receptacle 12 which has a delivery pipe or spout extending to the front portion of the casing for withdrawing the coffee through a pet cock or faucet 13. This receptacle 12 has a surrounding tapered or sloping rim portion 14 adapted to receive a corresponding portion 15 of a filter 16 which is placed therein and which is in the form of a pan having a handle 17. The portion 15 is flanged outwardly at the top as indicated at 18, to provide an angular ledge or shoulder to rest upon the portion 10 and to tightly conform thereto at the juncture of the interfitting portions 14 and 15, with an interposed gasket if desired, so that the chamber of the receptacle 12 is practically air tight when the filter is in position. The bottom of the percolator is perforated as indicated at 19 and above this is placed a filter paper 20 on which the ground coffee 21 is disposed.

In order to heat the water 7 in the boiler 6, a coiled heating element 22 is provided in the bottom of the latter and the conduit or bushing 23 provides means whereby electric wires or conductors designated at 24 may extend through the wall of the urn casing and chamber 6 and are provided with a plug 25 at the end for plugging in a wall socket. A vertical overflow cylinder or pipe 26 of a boiler element is provided in the center of the boiler upon the bottom wall 27 thereof, the lower part being provided with a flange or annular projection 28 on its periphery to rest upon the bottom wall 27 and being externally threaded as indicated at 29 to take a nut 30 which is hollow and formed with a pet cock, spout or nozzle 31 for discharging directly beneath into the percolator containing the ground coffee. The pipe or heater element 26 receives the water previously warmed or heated at a low temperature by the heating element 22 and as the water rises in the chamber 6, it overflows and is brought into a contact with a U-shaped electric heating element 32 which is mounted in the overflow pipe, and owing to the small quantity of water overflowing into contact with the heater element 32, which is maintained at a very high temperature, the water will be caused to boil and instantly pass off through the spout or cook 31 into and through the ground coffee in the percolator for the preparation of the beverage. The conductor wires 33 of the heater element 32 extend to the side above the water boiler and may be connected with a suitable switch 34 by which the same may be thrown into and out of operation. Also the overflow pipe 26 may contain any number of a plurality of perforated discs 35 through which the U-shaped heater element 32 is fitted as shown more particularly in Figure 3 of the drawings, so as to impede the travel or passage of the water in contact with the heating element 32 as it overflows over the top edge of the pipe 26 for discharge into the filter in preparing the beverage.

In order to supply water to the boiler 6, a water supply pipe from the main is provided, this pipe being designated at 36. It extends upwardly from one corner of the urn and branches inwardly for connection with a four-way valve casing 37 through the inlet 38 and when the valve proper 39 is in a position shown in Figure 4 by manipulation of the controlling handle 40, extending downwardly as shown, the water will pass out through the branch 41 into the pipe 42 for discharge into the boiler 6. A water inlet 43 is also provided leading in from the side and discharging into an aspirator or pump 44 discharging at the bottom and operated on the ejector principle which by reason of its connection by pipe 45 with the outlet branch 46 of the valve casing 37, will cause the air to be drawn from within the coffee receptacle 12 beneath the percolator, thus tending to create a suction or vacuum beneath the ground coffee to draw the water as it is discharged from the overflow pipe 26, through the ground coffee, filtering paper and perforations in the percolator as heretofore described. This is effected by a pipe connection 47 with the inlet branch 48 of the valve casing 37, which pipe 47 extends through the receptacle 12 as shown more particularly in Figure 1 of the drawings.

In addition a vent pipe or tube 49 is connected with the receptacle 12 and to the valve casing 37 so that when the pump is not operating, the air may pass into the receptacle 12 through this tube 49 whereby the coffee may be discharged. This is especially true, and desirable, when the suction pump is not operating. After the suction is complete, and the valve 39 is turned to close the branches 38 and 48 as shown in dotted lines in Figure 4, the beverage receptacle 12 will be restored to atmospheric pressure due to the fact that air will pass through the discharge pipe 50 to the connection pipe 45 to the valve casing 37 and then through the vent 49 to the beverage receptacle 12, thus making possible instantaneous flow of coffee through the bottom petcock. The discharge of the suction pump is designated at 50 leading to a waste water pipe, and while I have shown a pump of the ejector type, it is to be understood that any other suitable pump may be provided for creating suction tending to establish a vacuum in the beverage receptacle 12 beneath the percolator and that the same may be operated by any other suitable prime mover than by water power. Furthermore, it will be evident that by turning the valve 39 to an intermediate position horizontally or to close the branches 38 and 48 or 41 and 46 the supply of the water as well as the operation of the pump to create suction in the receptacle 12 will be cut off.

The important features of the invention will in connection with the foregoing description readily appear but particular attention is invited to the pump or means for creating a suction or vacuum between the filtering device and the liquid coffee receptacle, thereby functioning to draw the water through the ground coffee, the filtering paper and the perforations in the filter so as to instantly prepare the coffee upon the water overflowing into the overflow and heater pipe 26 in the contact with the heating element 32 and the vent for achieving this suction or vacuum. It will also be understood that the electric heating element or coil 22 will warm the water previous to its overflow into the pipe 26 where it is brought to a boil by contact with the heating element 32 and will be discharged through the nozzle or spout 31 into the bed of coffee in the coffee percolating and filtering receptacle 16. Since the vent 49 and the suction pipe 47 communicate with the receptacle 12 above the level of the liquid coffee therein, the coffee will not overflow into said vent pipe or vacuum pipe and the coffee may be drawn off as desired through the delivery spout and said cock or faucet 13. It will also be seen that the percolating and filtering receptacle for the coffee indicated at 16, may be readily placed in position or removed by means of its handle 17 through the opening 11 and the interfitting parts 14, 15, 10 and 18 will establish a substantially air tight seal between the receptacle and the atmosphere so that comunication is established only through the bottom of the filtering and filtering receptacle containing the ground coffee to facilitate drawing the water through said ground coffee. By reaching the hand into the opening 11, the filter may be lifted up and removed so that the filter paper and coffee grounds may be changed for producing a new supply of coffee.

While we have described our invention in what we consider to be the preferred form, it is to be understood that various changes and modifications may be made in the arrangements and proportions of the device so long as the same do not depart from the spirit and scope of the invention as covered by the claims appended hereto.

What we claim is:

1. In a coffee urn, a water containing chamber, means for maintaining the water therein at a warm temperature, an overflow pipe in the receptacle for receiving an overflow of the water, a heating element in said overflow pipe maintained at a high temperature adapted to boil the water upon overflowing into the pipe, and a filtering receptacle arranged beneath the outlet of the overflow pipe.

2. In a coffee urn, a water containing chamber, means for maintaining the water therein at a warm temperature, an overflow pipe in the chamber for receiving an overflow of the water, a heating element in said overflow pipe maintained at a high temperature adapted to boil the water upon overflowing into the pipe, a liquid coffee containing receptacle spaced below said outlet of the overflow pipe, a faucet associated with said receptacle, and a filtering receptacle mounted in air tight connection with the liquid coffee containing receptacle and having a perforated bottom adapted to receive a filtering paper thereon over which a bed of ground coffee is supported.

3. In a coffee urn, a casing having a hot water chamber at the top, means for supplying water thereto, a heater for maintaining the water in said chamber at a warm temperature, a vertical overflow pipe mounted on the bottom of said receptacle and having a discharge spout at the bottom, a heating element in said overflow pipe adapted to cause the water to boil after passing into the same, means for obstructing the passage of water through said overflow pipe, a liquid coffee receptacle supported in a spaced relation below the aforesaid receptacle and discharge end of the overflow pipe, a filtering receptacle mounted in said liquid coffee receptacle and removable through the opening therebetween, said percolating and filtering receptacle having a perforated bottom adapted to receive a filtering paper thereon with a bed of ground coffee thereover and sealed in connection therewith, means for drawing coffee from the liquid coffee receptacle, and means for creating a vacuum beneath the filtering receptacle.

4. In a coffee urn, a casing having a hot water chamber at the top, means for supplying water thereto, a heater for maintaining the water in said chamber at a warm temperature, a vertical overflow pipe mounted on the bottom of said receptacle and having a discharge spout at the bottom, a heating element in said overflow pipe adapted to cause the water to boil after passing into the same, means for obstructing the passage of water through said overflow pipe, a liquid coffee receptacle supported in a spaced relation below the aforesaid receptacle and discharge end of the overflow pipe, a percolating and filtering receptacle and removable through the opening therebetween, said percolating and filtering receptacle having a perforated bottom adapted to receive a filtering paper thereon with a bed of ground coffee thereover and sealed in connection therewith, means for drawing coffee from the liquid coffee receptacle, a pump associated with the water supply and having connection with the liquid coffee receptacle for creating a suction beneath the filtering receptacle to draw the boiling water through the coffee therein, and a vent also associated with said receptacle to permit the entrance of air therein to relieve the vacuum, when withdrawing said coffee.

5. In a coffee urn, a casing, a boiler at the top portion of the casing, an overflow pipe in the boiler having a discharge spout at the bottom, an electric heating element at the bottom of the boiler for maintaining the water at a warm temperature, an electric heating element in the overflow pipe for boiling the water in passing therethrough, a partition spaced below said overflow pipe and boiler having a suspended receptacle with a rim, a percolating and filtering receptacle fitting said rim in air tight connection and supported on the partition by a shoulder formed therein, a suction pump having connection with the receptacle first mentioned, a water supply pipe leading to the boiler, and a valve controlling said suction pipe and water supply pipe to simultaneously cut the same into and out of operation, said suction pipe creating a vacuum beneath the circulating and filtering receptacle and having means for venting the liquid coffee containing receptacle.

6. In a coffee urn, a casing having a boiler at the top, with overflow means for discharging boiling water at the bottom thereof, said means including a heating element for heating a small quantity of a moving body of water instantaneously, a receptacle spaced below the boiler, a percolating filter supported in air-tight connection within the receptacle, means for creating a suction in the receptacle beneath the filter to draw the water through the coffee in the filter and into the receptacle, and means to simultaneously allow air to enter the receptacle when the suction is cut off, said receptacle having means for drawing coffee therefrom.

7. In a device of the class described, a boiler, a heating element in a bottom portion of the boiler to warm water therein, an overflow pipe extending upwardly in the boiler and having an outlet at the botom, and a heater element in the overflow pipe adapted to boil the water as it overflows into said pipe for discharge into a percolator.

8. In a device of the class described, a boiler, a heating element in a botom portion of the boiler to warm water therein, an overflow pipe extending upwardly in the boiler and having an outlet at the bottom, a heater element in the overflow pipe adapted to boil the water as it overflows into said pipe for discharge into a percolator, said heating element being maintained at a high temperature, and means for obstructing the passage of water through said overflow pipe.

9. In a coffee urn, a casing, means for maintaining the water to be fed to the percolator of the urn at a warm temperature and located within the casing, a vertical pipe in the casing adapted to receive a moving body of water, a heating element in said vertical pipe and maintained at a high temperature adapted to boil the water upon flowing through the pipe, a coffee percolating and filtering receptacle arranged below the outlet end of the vertical pipe and into which the water is discharged, means for creating suction beneath the percolating and filtering receptacle, means for restoring atmospheric pressure in said receptacle when the suction creating means is rendered inoperative, and a common control means for said suction creating means and said atmospheric pressure restoring means.

10. In a coffee or like urn, a boiler, a water feed pipe for the boiler, a four-way valve interposed in the pipe, a vertical electric heater in the boiler having an overflow discharge, a coffee percolating receptacle disposed beneath the discharge of the heater, a liquid coffee receptacle below the percolator, said valve having communication with the water supply and with a discharge in the form of a pump for creating a suction beneath the percolator to suck or to draw the water through the coffee therein into the coffee receptacle, another connection with the valve communicating with the receptacle to permit the entrance of atmospheric air to said receptacle when the suction means is cut off by operation of the valve, and means for drawing the coffee from the coffee receptacle.

11. In a coffee or like urn, a preheated water container, an instantaneous heater receiving the preheated water and adapted to heat the same to a boiling temperature, a liquid coffee receptacle, a filtering and brewing receptacle mounted over the liquid coffee receptacle, said filtering and brewing receptacle receiving the boiling water, means for creating a vacuum beneath the filtering receptacle in the liquid coffee receptacle to draw the heated water through the coffee and filtering and brewing receptacle to hasten the extraction of the liquid coffee from the coffee grounds, means to cut off the vacuum creating means from within the liquid coffee receptacle and beneath the filtering receptacle to cause the entrance of atmospheric air to the liquid coffee receptacle and the discharge of the liquid coffee, and a faucet for the liquid coffee receptacle, said last-named means being actuated prior to the opening of the faucet to draw the coffee.

In testimony whereof we affix our signatures.

JOHN J. MILLER.
R. J. DEMEREE.
HERBERT DELAFIELD.